(12) United States Patent
Jun et al.

(10) Patent No.: US 12,224,123 B2
(45) Date of Patent: Feb. 11, 2025

(54) MULTILAYER ELECTRONIC COMPONENT

(71) Applicant: SAMSUNG ELECTRO-MECHANICS CO., LTD., Suwon-si (KR)

(72) Inventors: Ho In Jun, Suwon-si (KR); Kyeong Jun Kim, Suwon-si (KR); Mi Kyeong Kim, Suwon-si (KR); Eon Ju Noh, Suwon-si (KR); Hye Won Ryoo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 123 days.

(21) Appl. No.: 18/084,075

(22) Filed: Dec. 19, 2022

(65) Prior Publication Data

US 2023/0230768 A1    Jul. 20, 2023

(30) Foreign Application Priority Data

Jan. 19, 2022   (KR) .................. 10-2022-0007749

(51) Int. Cl.
*H01G 4/12*      (2006.01)
*C04B 35/468*    (2006.01)
(Continued)

(52) U.S. Cl.
CPC ....... *H01G 4/1227* (2013.01); *C04B 35/4682* (2013.01); *H01G 4/008* (2013.01);
(Continued)

(58) Field of Classification Search
CPC .... H01G 4/008; H01G 4/1227; H01G 4/2325; H01G 4/248; H01G 4/30;
(Continued)

(56) References Cited

U.S. PATENT DOCUMENTS

2017/0186543 A1* 6/2017 Park ................... H01G 4/1209
2020/0111612 A1* 4/2020 Jeong .................. H01G 4/012
(Continued)

FOREIGN PATENT DOCUMENTS

JP         2020-136298 A    8/2020
KR    10-2020-0096019 A     8/2020

*Primary Examiner* — Nathan Milakovich
(74) *Attorney, Agent, or Firm* — Morgan, Lewis & Bockius LLP

(57) ABSTRACT

A multilayer electronic component includes: a body including a plurality of dielectric layers and internal electrodes disposed to face each other with each of the plurality of dielectric layers interposed therebetween; and external electrodes connected to the internal electrodes and disposed on outer surfaces of the body, wherein each of the plurality of dielectric layers includes a $BaTiO_3$-based base material main component and an accessory component including dysprosium (Dy) and terbium (Tb), a content of terbium (Tb) is 0.2 mol or more and less than 1.0 mol based on 100 mol of the base material main component, and the dielectric layer includes a plurality of dielectric crystal grains having a particle size of 60 nm or more and 250 nm or less at a point (D50) at which a cumulative volume is 50% in a cumulative particle size distribution according to a particle size distribution system.

17 Claims, 4 Drawing Sheets

(51) Int. Cl.
*H01G 4/008* (2006.01)
*H01G 4/232* (2006.01)
*H01G 4/248* (2006.01)
*H01G 4/30* (2006.01)

(52) U.S. Cl.
CPC .......... *H01G 4/2325* (2013.01); *H01G 4/248* (2013.01); *H01G 4/30* (2013.01); *C04B 2235/3224* (2013.01); *C04B 2235/3236* (2013.01)

(58) Field of Classification Search
CPC .... C04B 2235/3224; C04B 2235/3236; C04B 35/4682
See application file for complete search history.

(56) References Cited

U.S. PATENT DOCUMENTS

2020/0251242 A1* 8/2020 Kwon .................. H01G 4/1227
2020/0258689 A1   8/2020 Kato

* cited by examiner

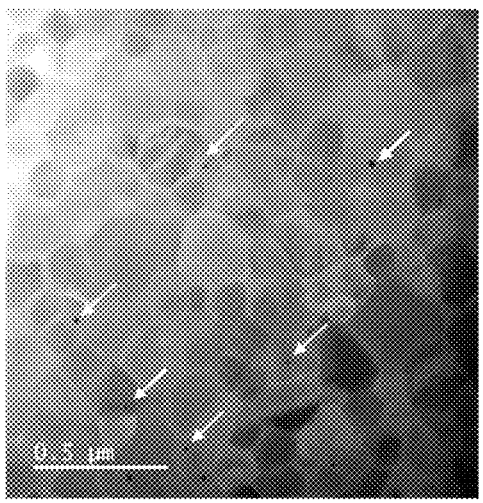
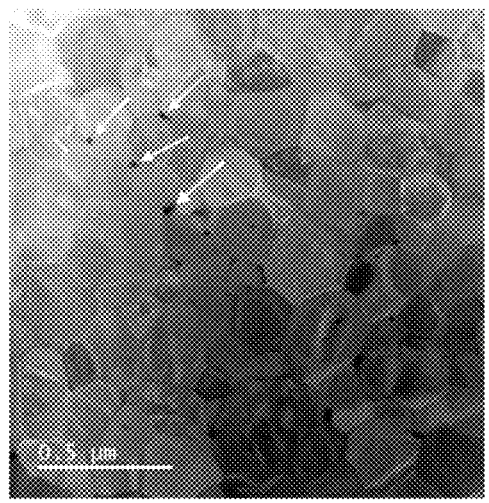
FIG. 3A
FIG. 3B

MULTILAYER ELECTRONIC COMPONENT

CROSS-REFERENCE TO RELATED APPLICATION(S)

This application claims benefit of priority to Korean Patent Application No. 10-2022-0007749 filed on Jan. 19, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on a printed circuit board of several electronic products such as an image device, for example, a liquid crystal display (LCD), a plasma display panel (PDP) or the like, a computer, a smartphone, and a mobile phone to serve to charge or discharge electricity therein or therefrom. In addition, as an application field of a capacitor has become gradually wider, a demand for miniaturization, a capacitance increase, and high reliability of the capacitor has gradually increased.

Meanwhile, there were attempts to improve reliability by including additive elements in a ceramic-based dielectric composition in order to achieve the capacitance increase and the high reliability of the capacitor, but when the dielectric composition is manufactured at a predetermined size or less, it was difficult to achieve a target high reliability level, and it was difficult to develop a new model due to low sintering stability.

RELATED ART DOCUMENT

Patent Document (Patent Document 1) Japanese Patent Laid-Open Publication No. 2020-136298

SUMMARY

An aspect of the present disclosure may provide a multilayer electronic component with improved reliability by including additive elements added to a ceramic-based dielectric composition.

However, the present disclosure is not limited thereto, and may be more easily understood in a process of describing exemplary embodiments in the present disclosure.

According to an aspect of the present disclosure, a multilayer electronic component may include: a body including a plurality of dielectric layers and internal electrodes disposed to face each other with each of the plurality of dielectric layers interposed therebetween; and external electrodes connected to the internal electrodes and disposed on outer surfaces of the body, wherein each of the plurality of dielectric layers includes a $BaTiO_3$-based base material main component and an accessory component including dysprosium (Dy) and terbium (Tb), a content of terbium (Tb) is 0.2 mol or more and less than 1.0 mol based on 100 mol of the base material main component, and the dielectric layer includes a plurality of dielectric crystal grains having a particle size of 60 nm or more and 250 nm or less at a point (D50) at which a cumulative volume is 50% in a cumulative particle size distribution according to a particle size distribution system.

BRIEF DESCRIPTION OF DRAWINGS

The above and other aspects, features, and advantages of the present disclosure will be more clearly understood from the following detailed description taken in conjunction with the accompanying drawings, in which:

FIGS. 3A and 3B are, respectively, images of dielectric grains in dielectric layers according to a Comparative Example and an Example, captured by a transmission electron microscope (TEM)

DETAILED DESCRIPTION

Figure 1:
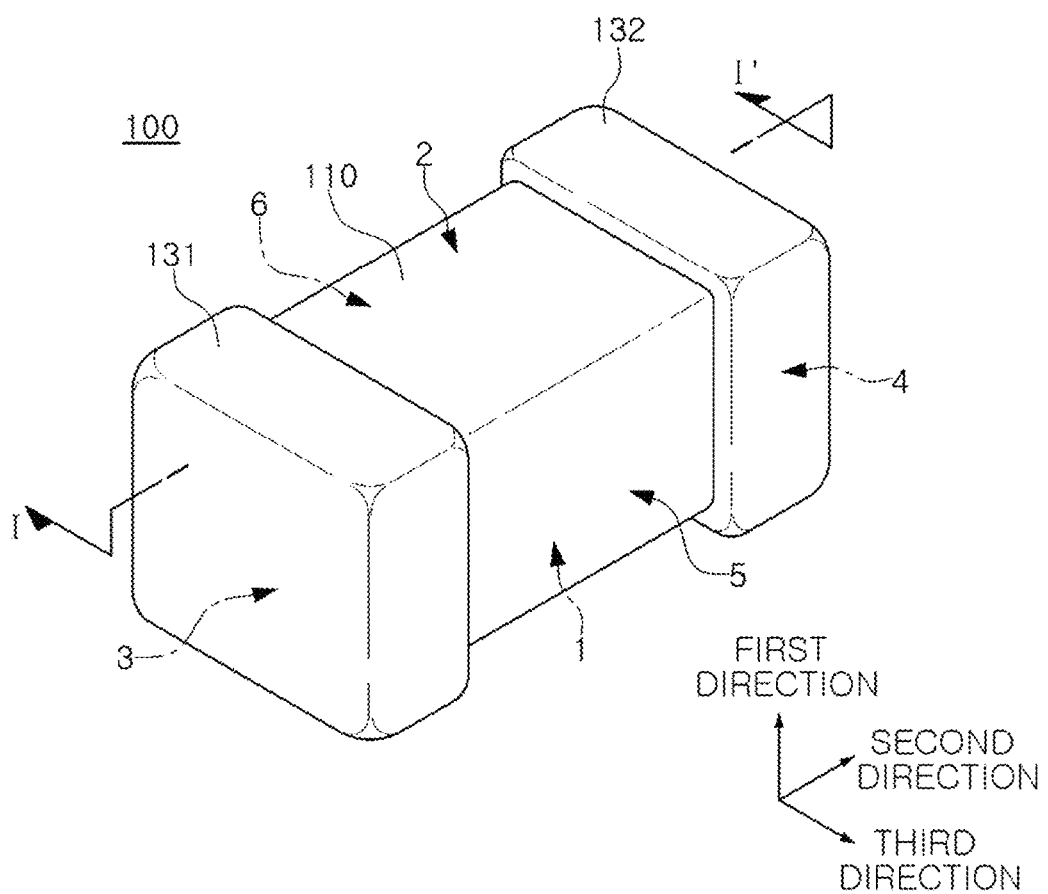
FIG. 1 is a schematic perspective view illustrating a multilayer electronic component according to an exemplary embodiment in the present disclosure.

In the drawings, a first direction may refer to a stacking direction or a thickness T direction, a second direction may refer to a length L direction, and a third direction may refer to a width W direction.

Multilayer Electronic Component

FIG. 1 is a schematic perspective view illustrating a multilayer electronic component according to an exemplary embodiment in the present disclosure.

Figure 2:
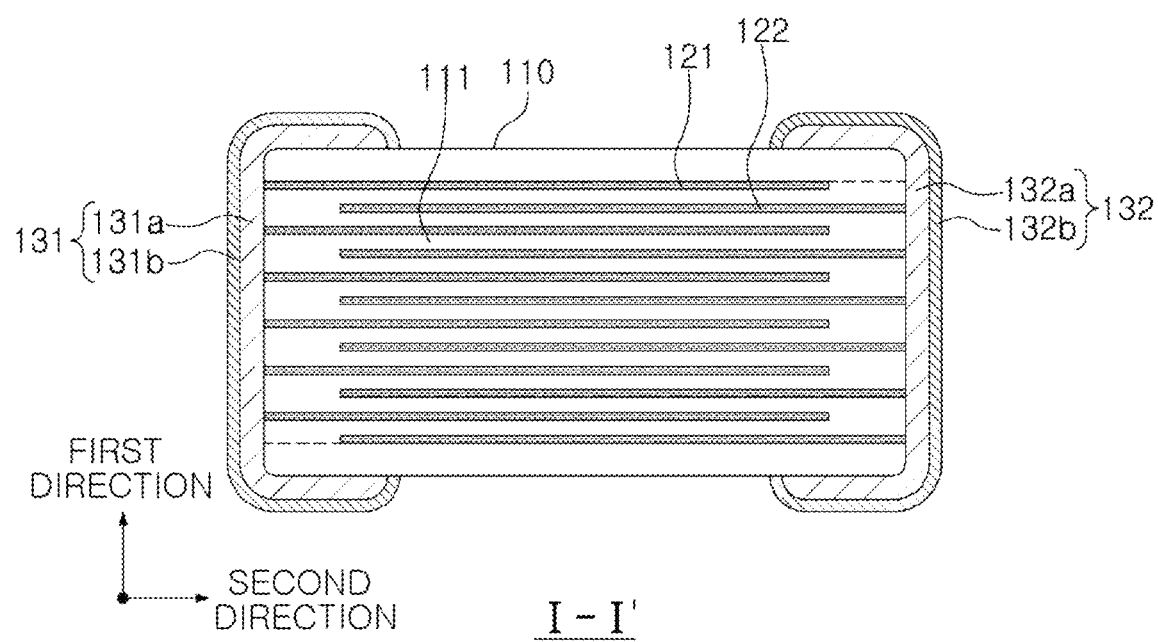
FIG. 2 is a cross-sectional view taken along line I-I' of FIG. 1.

FIG. 2 is a cross-sectional view taken along line I-I' of FIG. 1.

A multilayer electronic component according to an exemplary embodiment in the present disclosure will hereinafter be described in detail with reference to FIGS. 1 and 2.

A multilayer electronic component according to an exemplary embodiment in the present disclosure may include a body including a plurality of dielectric layers and internal electrodes disposed to face each other with each of the plurality of dielectric layers interposed therebetween, and external electrodes connected to the internal electrodes and disposed on outer surfaces of the body, wherein each of the plurality of dielectric layers includes a $BaTiO3$-based base material main component and an accessory component including dysprosium (Dy) and terbium (Tb), a content of terbium (Tb) is 0.2 mol or more and less than 1.0 mol based on 100 mol of the base material main component (or 0.2 mol or more and 0.6 mol or less based on 100 mol of the base material main component), and the dielectric layer includes a plurality of dielectric crystal grains having a particle size of 60 nm or more and 250 nm or less at a point (D50) at which a cumulative volume is 50% in a cumulative particle size distribution according to a particle size distribution system. In some embodiments, the particle size may be more than 60 nm and 250 nm or less or 120 nm or more and 250 nm or less.

The body 110 may include a plurality of dielectric layers 111 and internal electrodes 121 and 122 disposed to face each other with each of the plurality of dielectric layers 111 interposed therebetween.

A shape of the body 110 is not particularly limited, and may be a hexahedral shape or a shape similar to the hexahedral shape, as illustrated in FIGS. 1 and 2. Although the body 110 does not have a hexahedral shape having perfectly straight lines due to shrinkage of ceramic powder particles included in the body 110 in a sintering process, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces and opposing each other in a third direction.

The plurality of dielectric layers 111 forming the body 110 may be in a sintered state, and adjacent dielectric layers 111 may be integrated with each other so that boundaries therebetween are not readily apparent without using a scanning electron microscope (SEM).

A material of the dielectric layer 111 may be prepared by adding various ceramic additives, organic solvents, plasticizers, binders, dispersing agents, and the like, to powder particles such as barium titanate ($BaTiO_3$) powder particles, according to an object of the present disclosure.

Meanwhile, a thickness td of the dielectric layer 111 need not be particularly limited. However, the thickness td of the dielectric layer 111 may be 0.4 μm or less in order to more easily achieve miniaturization and a capacitance increase of the multilayer electronic component 100. Here, the thickness td of the dielectric layer 111 may refer to an average thickness of the dielectric layer 111. In this case, the number of dielectric layers 111 may be 400 or less in order to achieve the miniaturization and the capacitance increase of the multilayer electronic component, and a dielectric constant of the dielectric layer 111 at room temperature may be 3000 or more. Here, the dielectric constant of the dielectric layer may be defined as the dielectric constant of the multilayered electronic component relative to the vacuum dielectric constant measured at room temperature. The dielectric constant could be measured using a typical dielectric constant meter, and any other methods and/or tools appreciated by one of ordinary skill in the art, even if not described in the present disclosure, may also be used.

The average thickness of the dielectric layer 111 may be measured from an image obtained by scanning a cross section of the body 110 in the length and thickness directions (L-T) with a scanning electron microscope (SEM) of 10,000 magnifications. More specifically, an average value may be measured by measuring thicknesses of one dielectric layer 111 at 30 points positioned at equal intervals in the length direction in the obtained image. The 30 points positioned at equal intervals may be designated in an active part Ac. In addition, when average values of ten dielectric layers 111 are measured, an average thickness of the dielectric layer 111 may further be generalized.

In addition, the dielectric layer may include a $BaTiO_3$-based base material main component and an accessory component.

More specifically, the barium titanate ($BaTiO_3$)-based base material main component forming the dielectric layer 111 may include $BaTiO_3$ or $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$, but is not necessarily limited thereto. The main component may make up 50 wt % or more of the dielectric layer, based on a total weight of the dielectric layer.

The accessory component may include dysprosium (Dy) and terbium (Tb), and the content of terbium (Tb) may be 0.2 mol or more and less than 1.0 mol based on 100 mol of the base material main component.

In general, in order to secure reliability of a dielectric in the multilayer electronic component, a lot of rare earth elements have been added as accessory components. Among these rare earth elements, dysprosium (Dy) has been known to be effective in improving reliability by reducing a concentration of oxygen vacancies while substituting for Ba-site at the time of being added to barium titanate ($BaTiO_3$), which is a base material main component.

Meanwhile, when a rare earth element having an ionic radius greater than that of dysprosium (Dy), such as lanthanum (La) or samarium (Sm) is used, such a rare earth element may more effectively substitute for the Ba-site and may thus be more effective in reducing a concentration of oxygen vacancy defects, but was not actually used because there is a problem that insulation resistance is rapidly decreased due to excessive enhancement of semiconductor characteristics of the dielectric.

Therefore, it has been necessary to use a rare earth element of which an ionic radius is greater than that of dysprosium (Dy) and a size difference from dysprosium (Dy) is not great in order to suppress the enhancement of the semiconductor characteristics of the dielectric to secure the insulation resistance while significantly reducing the concentration of oxygen vacancy defects to improve the reliability.

In addition, since a fixed-valance of general rare earth elements is +3, when the general rare earth element substitutes for Ba(+2), $BaTiO_3$ in which the general rare earth element substitutes for Ba(2) has a single positive charge ($D'_{Ba}$), but when a rare earth element such as terbium (Tb) that may have a multi-valance of +4 substitutes for Ba(+2), BaTiOg in which the rare earth element such as terbium (Tb) substitutes for Ba(+2) may have a double positive charge ($D''_{Ba}$), and an effect of reducing the concentration of oxygen vacancy defects may thus be doubled.

To the contrary, a rare earth element such as ytterbium (Yb) that has a multi-valence of +2 is not effective in reducing the concentration of oxygen vacancy defects because $BaTiO_3$ in which the rare earth element such as ytterbium (Yb) substitutes for Ba(+2) is neutral in terms of charge at the time of substituting for Ba(+2). For this reason, it has been known that reliability is further decreased at the time of adding ytterbium (Yb).

As a result, a terbium (Tb) element that has an ionic radius greater than that of dysprosium (Dy), but does not enhance the semiconductor characteristics of the dielectric resistance and has a enough to reduce the insulation multi-valence was the most effective in reducing the concentration of oxygen vacancy defects, such that the terbium (Tb) element may significantly improve reliability of the dielectric in the multilayer electronic component, and it may be important to add a dielectric magnetic composition in which dysprosium (Dy) and terbium (Tb) are simultaneously used.

In the related art, there was an attempt to add one or more of dysprosium (Dy), gadolinium (Gd), and terbium (Tb) as rare earth elements to the dielectric magnetic composition, but terbium (Tb) was simply listed as a rare earth element or was added in only a small amount without recognizing the effect of terbium (Tb) described above, and it seems that there was no specific research into a content of terbium (Tb) added in order to improve the reliability.

Meanwhile, when the content of terbium (Tb) is less than 0.2 mol based on 100 mol of the base material main component, a reliability improvement effect according to the addition of terbium (Tb) may be insufficient, and when the content of terbium (Tb) is 1.0 mol or more based on 100 mol of the base material main component, it may be advantageous in terms of reliability, and a Curie temperature (Tc) may move to room temperature, such that temperature characteristics such as a temperature coefficient of capacitance (TCC) may be significantly deteriorated, and insulation resistance may be decreased due to enhancement of semiconductor characteristics of the dielectric.

Meanwhile, the dielectric layer may include a plurality of dielectric crystal grains having a particle size of 60 nm or more and 250 nm or less at a point (D50) at which a cumulative volume is 50% in a cumulative particle size distribution according to a particle size distribution system.

Here, D50 may refer to a particle size at the point at which the cumulative volume is 50% in the cumulative particle size distribution according to the particle size distribution system. For example, that D50=100 nm means that particles having a size of 100 nm or less occupy 50 vol % by volume accumulation.

More specifically, the D50 size of the dielectric crystal grains may be 60 nm or more and 250 nm or less by adding an accessory component to a solid-phase fine base material having a D50 size of 50 nm or more and 150 nm or less to induce crystal grain growth.

When D50 of the solid-phase fine base material is 50 nm, the crystal grain growth according to the addition of the accessory component may be 60 nm or more and 100 nm or less on the basis of D50, and when D50 of the solid-phase fine base material is 150 nm, the crystal grain growth according to the addition of the accessory component may be 170 nm or more and 250 nm or less on the basis of D50.

Meanwhile, when the D50 size of the dielectric grains is less than 50 nm, there may be a risk that an expected effect will be insufficiently implemented due to an added element solid-solution insufficiency phenomenon caused by a decrease in a dielectric constant and a decrease in a grain growth rate, and when the D50 size of the dielectric grains exceeds 250 nm, there may be a risk that a capacitance change rate according to temperature characteristics and a direct current (DC) voltage will increase, and there may be a risk that reliability of the multilayer electronic component will be deteriorated due to a decrease in the number of dielectric crystal grains per dielectric layer or generation of pores in the dielectric. D50 may be determined by analyzing the dielectric grains in a cross section of the body using an optical microscope (OM), a scanning electron microscope (SEM), a transmission electron microscope (TEM) or the like, and processing the obtained micrographs with an image processing software. However, the present disclosure is not limited thereto. In this case, D50 (median) may be defined as deriving a median value, and the median value may be defined as a value in the middle of a set of numbers. For example, if the total number of data is odd, one value in the middle of the total data may corresponds to the median value, and if the total number of data is even, the average of the two values in the middle of the total data may correspond to the median value.

In an exemplary embodiment in the present disclosure, a content of dysprosium (Dy) may be 0.2 mol or more and less than 1.2 mol based on 100 mol of the base material main component (or 0.2 mol or more and 1.0 mol or less based on 100 mol of the base material main component).

Meanwhile, when the content of dysprosium (Dy) is less than 0.2 mol based on 100 mol of the base material main component, a reliability improvement effect according to the addition of dysprosium (Dy) may be insufficient, and when the content of dysprosium (Dy) is 1.2 mol or more based on 100 mol of the base material main component, it may be advantageous in terms of reliability, and a Curie temperature (Tc) may move to room temperature, such that temperature characteristics such as a TCC may be significantly deteriorated, and insulation resistance may be decreased due to enhancement of semiconductor characteristics of the dielectric.

The contents of terbium (Tb), dysprosium (Dy), and the base material main component may be obtained by, for example, performing a scanning electron microscopy-energy dispersive spectroscopy (SEM-EDS), a transmission electron microscopy-energy dispersive spectroscopy (TEM-EDS) or the like on a cross-section of the body. Other methods and/or tools appreciated by one of ordinary skill in the art, even if not described in the present disclosure, may also be used.

In some embodiments, a molar ratio (Tb/Dy) of a content of terbium (Tb) to a content of dysprosium (Dy) may satisfy 0.50 Tb/Dy and Tb/Dy may be less than 0.83.

In an exemplary embodiment in the present disclosure, b/A<0.01 in which A is the total number of dielectric crystal grains, and b is the number of dielectric crystal grains having pores existing therein. More preferably, the pores may not exist in the dielectric crystal grains, and may be disposed at triple points of crystal grain boundaries. A and b may be determined from processing a micrograph of a cross section of the body using an image processing software. Other methods and/or tools appreciated by one of ordinary skill in the art, even if not described in the present disclosure, may also be used.

More specifically, as the rare earth element is added to the base material main component, crystal grain growth may occur. In this case, the pores may remain in the crystal grains, such that reliability of the multilayer electronic component may be deteriorated.

In order to prevent such a problem, dysprosium (Dy) or terbium (Tb) may be added to the solid-phase fine base material having the size of 50 nm or more and 150 nm or less, but when the content of dysprosium (Dy) is adjusted to be 0.2 mol or more and less than 1.2 mol based on 100 mol of the base material main component or the content of terbium (Tb) is adjusted to be 0.2 mol or more and less than 1.0 mol based on 100 mol of the base material main component, the multilayer electronic component may be manufactured so that the pores do not exist or hardly exist in the crystal grains, while having improved reliability.

FIGS. 3A and 3B are images of dielectric grains in dielectric layers. Referring to FIGS. 3A and 3B, it may be confirmed from FIG. 3A that when a dysprosium (Dy) additive was added to a $BaTiO_3$-based fine base material produced through a hydrothermal synthesis method according to the related art and having a size less than 200 nm, crystal grains had crystal grain sizes of 180 nm or more and 300 nm or less, and pores were formed in the crystal grains. On the other hand, it may be confirmed from FIG. 3B that when an additive including dysprosium (Dy) and terbium (Tb) was added to the $BaTiO_3$ solid-phase fine base material having a size less than 200 nm, which is an Example, pores were hardly formed in crystal grains, and were formed at triple points.

Meanwhile, the internal electrodes 121 and 122 may include an active part Ac forming capacitance by including first internal electrodes 121 and second internal electrodes 122. That is, the body 110 may be formed by alternately stacking dielectric layers 111 on which the first internal electrode 121 is printed and dielectric layers 111 on which the second internal electrode 122 is printed, in the first direction and then sintering the stacked dielectric layers 111.

The first internal electrodes 121 may be spaced apart from the fourth surface 4 and be exposed through the third surface 3, and the second internal electrodes 122 may be spaced apart from the third surface 3 and be exposed through the fourth surface 4. In addition, the first internal electrodes 121 may be exposed through the third, fifth, and sixth surfaces 3, 5, and 6. In this case, the first and second internal electrodes 121 and 122 may be electrically separated from each other by each of the plurality of dielectric layers 111 disposed therebetween.

According to the configuration as described above, when predetermined voltages are applied to first and second external electrodes 131 and 132, charges may be accumulated between the first and second internal electrodes 121 and 122. In this case, capacitance of the multilayer electronic component 100 may be proportional to an area of the first and second internal electrodes 121 and 122 overlapping each other along the first direction in the active part Ac.

A material forming the internal electrodes 121 and 122 is not particularly limited, and may include, for example, one or more of nickel (Ni), copper (Cu), palladium (Pd), silver (Ag), gold (Au), platinum (Pt), tin (Sn), tungsten (W), titanium (Ti), and alloys thereof, and the internal electrodes 121 and 122 may be formed using a conductive paste.

Meanwhile, a thickness the of each of the internal electrodes 121 and 122 need not be particularly limited. However, the thickness the of each of the internal electrodes 121 and 122 may be 0.4 µm or less in order to more easily achieve miniaturization and a capacitance increase of the multilayer electronic component 100. Here, the thickness te of each of the internal electrodes 121 and 122 may refer to an average thickness of each of the first and second internal electrodes 121 and 122.

The average thickness of each of the internal electrodes 121 and 122 may be measured from an image obtained by scanning a cross section of the body 110 in the length and thickness directions (L-T) with a scanning electron microscope (SEM) of 10,000 magnifications. More specifically, an average value may be measured by measuring thicknesses of one internal electrode 121 or 122 at 30 points positioned at equal intervals in the length direction in the obtained image. The 30 points positioned at equal intervals may be designated in an active part Ac. In addition, when average values of ten internal electrodes 121 or 122 are measured, an average thickness of each of the internal electrodes 121 and 122 may further be generalized.

In an exemplary embodiment in the present disclosure, td/te>2 in which te is an average thickness of the internal electrode, and td is an average thickness of the dielectric layer.

td/te>2, such that a sufficient dielectric constant of the multilayer electronic component may be secured, and miniaturization and a capacitance increase of the multilayer electronic component may be achieved.

The external electrodes 131 and 132 may be disposed on the outside surfaces of the body 110, be connected to the internal electrodes 121 and 122, respectively, and disposed on the third and fourth surfaces 3 and 4 of the body 110, respectively.

The external electrodes 131 and 132 may include a first external electrode 131 and a second external electrode 132 connected respectively to the first and second internal electrodes 121 and 122. More specifically, the external electrodes may include a first external electrode 131 disposed on the third surface 3 of the body 110 and a second external electrode 132 disposed on the fourth surface 4 of the body 110. In this case, the second external electrode 132 may be connected to an electric potential different from that of the first external electrode 131.

A structure in which the multilayer electronic component 100 includes two external electrodes 131 and 132 has been described in the present specification, but the number, shapes or the like of external electrodes 131 and 132 may be changed depending on shapes of the internal electrodes 121 and 122 or other purposes.

More specifically, the external electrodes 131 and 132 may include electrode layers 131a and 132a disposed on the body 110, respectively. The electrode layers 131a and 132a may be fired electrodes including a conductive metal and glass, or resin-based electrodes including a conductive metal and a base resin. Alternatively, the electrode layers 131a and 132a may have a form in which fired electrodes and resin-based electrodes are sequentially formed on the body 110. In addition, the electrode layers 131a and 132a may be formed in a manner of transferring a sheet including a conductive metal onto the body 110 or be formed in a manner of transferring a sheet including a conductive metal onto a fired electrode.

That is, the electrode layers 131a and 132a may include first electrode layers including a first conductive metal and glass and second electrode layers disposed on the first electrode layers and including a second conductive metal and a resin, and the first and the second conductive materials may include one or more selected from the group consisting of copper (Cu), nickel (Ni), palladium (Pd), silver (Ag), and alloys thereof.

The external electrodes 131 and 132 may be formed of any material having electrical conductivity, such as a metal, a specific material of each of the external electrodes 131 and 132 may be determined in consideration of electrical characteristics, structural stability and the like, and the external electrodes 131 and 132 may have a multilayer structure.

In an exemplary embodiment in the present disclosure, the external electrodes 131 and 132 may further include plating layers 131b and 132b disposed on the electrode layers 131a and 132a, respectively.

The plating layers 131b and 132b may serve to improve mounting characteristics of the multilayer electronic component. The plating layers 131b and 132b may be formed by sputtering or electroplating, and may be formed as a plurality of layers, but are not particularly limited thereto. For example, the plating layers may have a form in which first plating layers and second plating layers are sequentially formed on the electrode layers 131a and 132a, and the first and second plating layers may include one or more selected from the group consisting of copper (Cu), nickel (Ni), tin (Sn), palladium (Pd), platinum (Pd), gold (Au), silver (Ag), lead (Pd), and alloys thereof, but a type of the plating layer is particularly limited.

As a more specific example of the plating layers, the plating layer may be Ni or Sn plating layers, and may have a form in which Ni plating layers and Sn plating layers are sequentially formed as first plating layers and second plating layers on the electrode layers 131a and 132a, respectively, or have a form in which Sn plating layers, Ni plating layers, and Pd plating layers may be sequentially formed on the electrode layers 131a and 132a. Alternatively, the plating layer may include a plurality of Ni plating layers and/or a plurality of Sn plating layers. The external electrodes may include the plating layers, such that mountability of the multilayer electronic component on a substrate, structural reliability of the multilayer electronic component, external durability of the multilayer electronic component, heat resistance of the multilayer electronic component, and/or equivalent series resistance (ESR) of the multilayer electronic component may be improved.

The glass may serve to improve bondability and moisture resistance of the external electrodes 131 and 132. That is, adhesion may be maintained between the electrode layers 131a and 132a of the external electrodes and the dielectric layers 111 of the body 110 by a glass component.

The glass may be a composition in which oxides are mixed with each other, and may be one or more selected from the group consisting of silicon oxide, boron oxide, aluminum oxide, transition metal oxide, alkali metal oxide, and alkaline earth metal oxide, but is not particularly limited thereto.

In an exemplary embodiment in the present disclosure, a mean time to failure (MTTF) of the multilayer electronic component may be 145 hours or more.

Here, the MTTF may refer to a mean time from the start of use of non-repairable products until failure, and may be calculated through (total operating time/number of failure products). That is, the MTTF may be one of the numerical values that may expect a lifespan period of a non-repairable device, and it may be evaluated that the longer the MTTF time, the better the reliability of the product. Specific criteria for the MTTF will be described in the Example to be described later.

A size of the multilayer electronic component 100 described in the present specification need not be particularly limited. However, since the numbers of stacked dielectric layers and internal electrodes need to be increased by decreasing thicknesses of the dielectric layers 111 and the internal electrodes 121 and 122 in order to achieve both the miniaturization and the capacitance increase of the multilayer electronic component, a reliability improvement effect according to the present disclosure in a multilayer electronic component 100 having a size of 0402 (length×width: 0.4 mm×0.2 mm) or less may become more remarkable.

Hereinafter, the present disclosure will be described in more detail through the Examples. However, they are to assist in the detailed understanding of the present disclosure, and the scope of the present disclosure is not limited by the Examples.

EXAMPLE

In Example 1, dielectric layers including dielectric crystal grains having a D50 size of 120 nm or more and 250 nm or less by adding an accessory component including dysprosium (Dy) and terbium (Tb) to a dielectric composition including barium titanate ($BaTiO_3$) were formed. In this case, dysprosium (Dy) of the added accessory component was added in an amount of 0.9 mol based on 100 mol of $BaTiO_3$, and terbium (Tb) of the added accessory component was added in an amount of 0.5 mol based on 100 mol of $BaTiO_3$.

Comparative Example 1 includes dielectric layers in which dielectric crystal grains are formed by adding an accessory component including dysprosium (Dy) to a BCT-based dielectric composition, which is barium titanate ($BaTiO_3$) including calcium (Ca). In this case, dysprosium (Dy) of the added accessory component was included in an amount of 1.5 mol based on 100 mol of BCT.

Comparative Example 2 includes dielectric layers in which dielectric crystal grains are formed by adding an accessory component including dysprosium (Dy) to a BCT-based dielectric composition, which is barium titanate ($BaTiO_3$) including calcium (Ca). In this case this case, dysprosium (Dy) of the added accessory component was included in an amount of 1.6 mol based on 100 mol of BCT.

Measurement of temperature characteristics and a highly accelerated limit test (HALT) were performed on sample chips including the dielectric layers having the compositions as described above, and defective rates were evaluated.

As the temperature characteristics, temperature coefficients of capacitance (TCCs) were measured, and an X7S temperature characteristic criterion needs to satisfy±22% of capacitance in the range of −55° C. or higher to 125° C. based on capacitance at 25° C. Bias TCC refers to a maximum value of a capacitance change rate (%) in the range of −55° C. or higher to 125° C. based on the capacitance at 25° C.

Figure 4A:
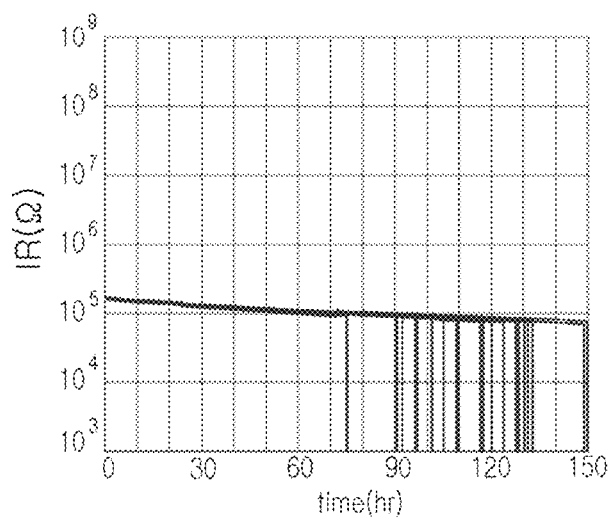
FIGS. 4A through 4C are graphs illustrating severe reliability evaluation results according to the Comparative Example and the Example.
Figure 4B:
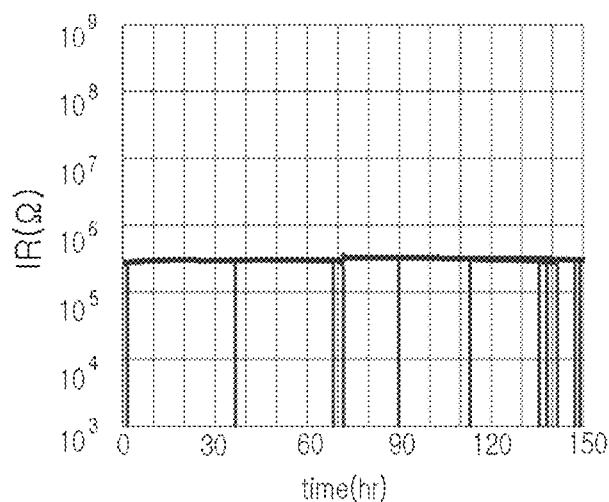
Figure 4C:
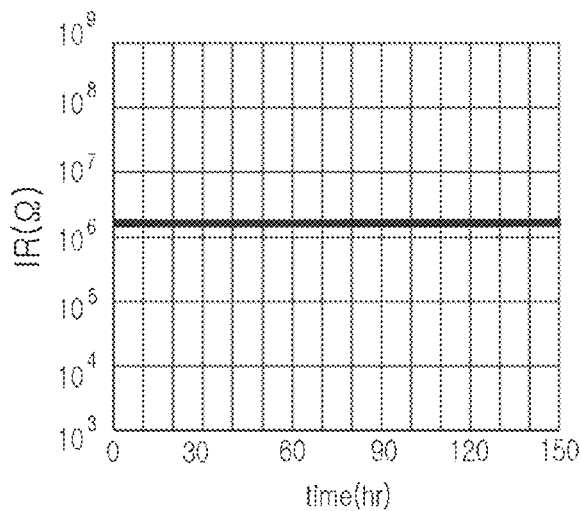

Referring to FIGS. 4A through 4C, the HALT was performed by mounting 40 sample chips for each Comparative Example and each Example on a substrate and applying a voltage of 48 V to the 40 sample chips at a temperature of 150° C. for 150 hours.

TABLE 1

| Division | | Comparative Example 1 | Comparative Example 2 | Example 1 |
|---|---|---|---|---|
| Presence/Absence of Terbium (Tb) | | Absent | Absent | Present |
| Number of Stacked Dielectric Layers | | 353 | 383 | 370 |
| Dielectric Constant | | 3062 | 2647 | 3320 |
| Temperature Characteristics (X7S) | Minimum Temperature (%) | −24.4 | −11.7 | −19.4 |
| | Maximum Temperature (%) | −15.6 | −16.9 | −20.8 |
| | Bias TCC (%) | −67.38 | −60.27 | −68.1 |

Referring to Table 1 and FIGS. 4A through 4C, in Comparative Example 1 to which terbium (Tb) was not added, the temperature characteristics (X7S) were not satisfied, and also in the HALT (see FIG. 4A), a result value showed that reliability was not improved. Similarly, in Comparative Example 2 to which terbium (Tb) was not added, even though the number of stacked dielectric layers was high, a dielectric constant was relatively low, and even though the temperature characteristics (X7S) were good, in the HALT (see FIG. 4B), a result value showed that reliability was not improved.

On the other hand, in Example 1 in which terbium (Tb) is added, the temperature characteristic (X7S) was satisfied, and also in the HALT (see FIG. 4C), a result value showed that reliability was improved.

Additionally, results of additionally performing the HALT on Comparative Example 2 and Example 1 were shown in Table 2. In this case, the HALT was performed by mounting 40 sample chips for each of Comparative Example 2 and Example 1 on a substrate and applying a voltage of 75 V to the 40 sample chips at a temperature of 150° C. for 125 hours.

TABLE 2

| Division | | Comparative Example 2 | Example 1 |
|---|---|---|---|
| Presence/Absence of Terbium (Tb) | | Absent | Present |
| Highly Accelerated Limit Test (HALT) (150° C., 75 V) | First Failure (Time) | 2.35 | 39.02 |
| | Average Lifespan (Time) | 7.12 | 145.65 |

Referring to Table 2, in Comparative Example 2 to which terbium (Tb) was not added, when 75 V was applied to the sample chip at a temperature of 150° C., a first failure time was 2.35 hours and an average lifespan was 7.12 hours, which showed a result poor in reliability.

On the other hand, in Example 1 in which terbium (Tb) was added, a first failure time was 39.02 hours and an average lifespan was 145.65 hours under the same conditions, which showed a result improved in reliability.

Accordingly, it can be seen from Experimental Examples that reliability of the multilayer electronic component may be improved due to addition of terbium (Tb) and dysprosium (Dy).

As set forth above, according to an exemplary embodiment in the present disclosure, when the electric layers are formed by adding additive elements to a ceramic-based dielectric composition, reliability of the multilayer electronic component may be improved.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a plurality of dielectric layers and internal electrodes disposed to face each other with each of the plurality of dielectric layers interposed therebetween; and
external electrodes connected to the internal electrodes and disposed on outer surfaces of the body,
wherein each of the plurality of dielectric layers includes a $BaTiO_3$-based base material main component and an accessory component including dysprosium (Dy) and terbium (Tb),
a content of terbium (Tb) is 0.2 mol or more and less than 1.0 mol based on 100 mol of the base material main component, and
the dielectric layers include a plurality of dielectric crystal grains having a particle size of 60 nm or more and 250 nm or less at a point (D50) at which a cumulative volume is 50% in a cumulative particle size distribution according to a particle size distribution system.

2. The multilayer electronic component of claim 1, wherein a content of dysprosium (Dy) is 0.2 mol or more and less than 1.2 mol based on 100 mol of the base material main component.

3. The multilayer electronic component of claim 1, wherein the base material main component is $BaTiO_3$.

4. The multilayer electronic component of claim 1, wherein b/A<0.01 in which A is the total number of dielectric crystal grains, and b is the number of dielectric crystal grains having pores existing therein.

5. The multilayer electronic component of claim 1, wherein pores are disposed at triple points of crystal grain boundaries.

6. The multilayer electronic component of claim 1, wherein an average thickness of the dielectric layers are 0.4 µm or less.

7. The multilayer electronic component of claim 1, wherein an average thickness of the internal electrodes are 0.4 µm or less.

8. The multilayer electronic component of claim 1, wherein td/te>2 in which the is an average thickness of the internal electrodes, and td is an average thickness of the dielectric layers.

9. The multilayer electronic component of claim 1, wherein the external electrodes include electrode layers disposed on the body and connected to the internal electrodes,
the electrode layers include:
first electrode layers including a first conductive metal and glass; and
second electrode layers disposed on the first electrode layers and including a second conductive metal and a resin, and
the first and second conductive metals include one or more selected from the group consisting of copper (Cu), nickel (Ni), palladium (Pd), silver (Ag), and alloys thereof.

10. The multilayer electronic component of claim 1, wherein the external electrodes include:
electrode layers disposed on the body and connected to the internal electrodes; and
plating layers disposed on the electrode layers, and
the plating layers include one or more selected from the group consisting of copper (Cu), nickel (Ni), tin (Sn), palladium (Pd), platinum (Pd), gold (Au), silver (Ag), lead (Pd), and alloys thereof.

11. The multilayer electronic component of claim 1, wherein a dielectric constant of the dielectric layers at room temperature is 3000 or more.

12. The multilayer electronic component of claim 1, wherein a mean time to failure (MTTF) of the multilayer electronic component is 145 hours or more.

13. The multilayer electronic component of claim 1, wherein a molar ratio (Tb/Dy) of a content of terbium (Tb) to a content of dysprosium (Dy) satisfies 0.50<Tb/Dy.

14. The multilayer electronic component of claim 1, wherein the particle size is more than 60 nm and 250 nm or less.

15. The multilayer electronic component of claim 1, wherein the particle size is 120 nm or more and 250 nm or less.

16. The multilayer electronic component of claim 1, wherein the content of terbium (Tb) is 0.2 mol or more and 0.6 mol or less based on 100 mol of the base material main component.

17. The multilayer electronic component of claim 1, wherein a content of dysprosium (Dy) is 0.2 mol or more and 1.0 mol or less based on 100 mol of the base material main component.

* * * * *